(12) United States Patent
Jorgensen

(10) Patent No.: US 7,078,001 B2
(45) Date of Patent: Jul. 18, 2006

(54) SYSTEM AND METHOD FOR EXPOSING AN OBJECT TO AN ELECTRICAL DISCHARGE

(76) Inventor: Morten Jorgensen, 4676 S. Shore Ave., Slinger, WI (US) 53086

(*) Notice: Subject to any disclaimer, the term of this patent is extended or adjusted under 35 U.S.C. 154(b) by 459 days.

(21) Appl. No.: 10/284,812

(22) Filed: Oct. 31, 2002

(65) Prior Publication Data

US 2004/0086433 A1    May 6, 2004

Related U.S. Application Data

(60) Provisional application No. 60/422,294, filed on Oct. 30, 2002.

(51) Int. Cl.
*B01J 19/08* (2006.01)
(52) U.S. Cl. .................. 422/186.05; 118/638
(58) Field of Classification Search ........... 422/186.05; 118/638
See application file for complete search history.

(56) References Cited

U.S. PATENT DOCUMENTS

| | | | |
|---|---|---|---|
| 3,021,270 A | 2/1962 | Tarbox et al. | 204/168 |
| 3,385,966 A | 5/1968 | Rosenthal | 250/49.5 |
| 3,858,546 A * | 1/1975 | Benson et al. | 118/16 |
| 5,173,046 A | 12/1992 | Walker | 432/121 |
| 5,458,714 A | 10/1995 | Brandt et al. | 156/237 |
| 5,472,747 A * | 12/1995 | Poo et al. | 427/536 |
| 5,650,028 A | 7/1997 | Brandt et al. | 156/64 |
| 6,007,784 A | 12/1999 | Jorgensen | 422/186.05 |

OTHER PUBLICATIONS

"Self-contained Corona Treating System Ensured Optimal Adhesion on Cylindrical Polyolefine Bottles", Nov. of 1988, 1 page.
"SOFTAL 3DT Corona Treating System", available at www.3dtllc.com, 2 pages.
"Product Line—LT2000", printed at Internet address: http://www.lectrotreat.com/products/products.html on Oct. 31, 2002, 7 pages.

* cited by examiner

*Primary Examiner*—Kishor Mayekar
(74) *Attorney, Agent, or Firm*—Foley & Lardner LLP

(57) ABSTRACT

A conveyor system for exposing an object to an electrical discharge to increase the surface tension of a surface of the object comprises a guide, a first conveyor, an electrode, and a second conveyor. The first conveyor is configured to convey the object toward the guide. The electrode is configured to provide an electrical discharge. The guide and the second conveyor are configured to rotate the object for exposure to the electrical discharge.

15 Claims, 4 Drawing Sheets

SYSTEM AND METHOD FOR EXPOSING AN OBJECT TO AN ELECTRICAL DISCHARGE

CROSS-REFERENCE TO RELATED APPLICATIONS

This application claims the benefit of U.S. Provisional Application No. 60/422,294, filed Oct. 30, 2002, entitled "System and Method for Exposing an Object to an Electrical Discharge" by Morten Jorgensen.

BACKGROUND

In the field of exposing an object to an electrical discharge, one known method is corona treatment. Corona treatment is the exposure of an object to a corona discharge, which is generated by exposing atmospheric air to different voltage potentials. A corona is the faint glow enveloping from an electrode in a corona discharge, often accompanied by streamers directed toward a second electrode. When a plastic substance is placed under the corona discharge, the electrons generated in the discharge impact on a surface of the substance to be treated with sufficient energy to break the molecular bonds on the treatment surface. Oxidation of the treatment surface increases the surface energy, allowing for better wetting by liquids and promoting adhesion. The oxidation results in an improved surface tension, which advantageously provides for improved bonding of liquids, adhesives, and inks to plastic surfaces and other surfaces.

One use for corona treatment is in treating the surfaces of plastic containers which contain household (and other) products, such as shampoo, cleaner, oil, paint, etc. One challenge in treating these containers is that the containers come in various shapes and sizes. Therefore, it would be advantageous to have a system for exposing a wide variety of extrusion or injection blow molded containers to an electrical discharge without requiring adjustment of the treatment system.

In one prior method of treating polyolefin objects, a conveyor belt provides an object to an electrical discharge apparatus for treatment. However, this system requires an alignment plate and an adjustable guiding arm. This system has the disadvantage of requiring operator adjustment to accommodate different treatment processes.

Accordingly, what is needed is an improved system and method for exposing an object to an electrical discharge. Further, there is a need for such a system which does not require operator adjustments to accommodate various sizes and shapes of objects to be treated. Further still, there is a need for a system which has a conveyor mechanism which, when worn, can be more quickly and inexpensively replaced. Further still, what is needed is a system having a conveyor mechanism that does not require belt tensioning or belt alignment systems. Further still, what is needed is an improved guide having less rapid wear of the guide (due to the corona discharge between the guide and the electrode) and more optimal treatment of the object to be treated. Further still, what is needed is an improved wire electrode for optimal treatment of the object to be treated. Further still, what is needed is an improved system and method of providing the object at a predetermined distance from the electrode with better reliability than prior systems.

The teachings hereinbelow extend to those embodiments which fall within the scope of the appended claims, regardless of whether they accomplish one or more of the above-mentioned needs.

SUMMARY

According to one exemplary embodiment, a conveyor system for exposing an object to an electrical discharge to increase the surface tension of a surface of the object comprises a guide, a first conveyor, an electrode, and a second conveyor. The first conveyor is configured to convey the object toward the guide. The electrode is configured to provide an electrical discharge. The guide and the second conveyor are configured to rotate the object for exposure to the electrical discharge.

According to another exemplary embodiment, a conveyor system for exposing an object to an electrical discharge comprises an electrode, a conveyor, and a fixed, non-adjustable guide. The electrode is configured to provide an electrical discharge to the object to change the surface tension of a surface of the object. The fixed, non-adjustable guide is disposed between the electrode and the object. The conveyor is configured to convey the object against the guide member.

According to yet another exemplary embodiment, a system for exposing an object to an electrical discharge comprises an electrode, a first conveyor, and a second conveyor. The electrode is configured to provide an electrical discharge. The first conveyor comprises a first belt moving in a first direction configured to move the object toward the electrode. The second conveyor comprises a second belt moving in a second direction not parallel to the first direction. The second conveyor is configured to rotate and move the object for exposure to the electrical discharge. The surface tension of a surface of the object is changed.

BRIEF DESCRIPTION OF THE DRAWINGS

The invention will become more fully understood from the following detailed description, taken in conjunction with the accompanying drawings, wherein like reference numerals refer to like parts and wherein.

DETAILED DESCRIPTION OF EXEMPLARY EMBODIMENTS

Figure 1:
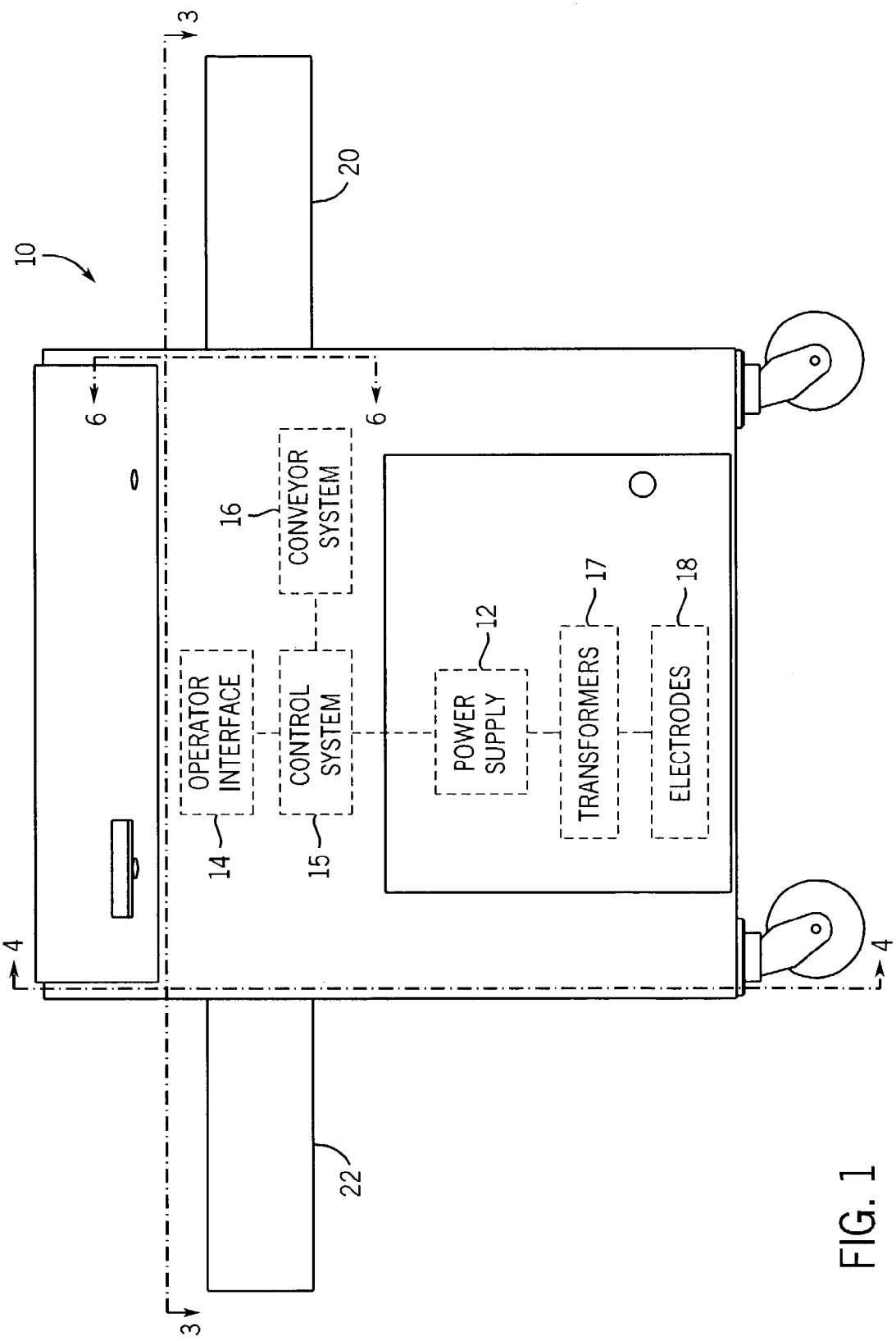
FIG. 1 is a front view of a system for exposing an object to an electrical discharge, according to an exemplary embodiment.

Referring to FIG. 1, a treatment system 10 is shown. Treatment system 10 is a system for exposing an object to an electrical discharge. In this exemplary embodiment, the electrical discharge changes the surface tension of a surface of the object by oxidizing the surface to make the surface receptive to inks, adhesives, etc.

The object can have a treatment surface comprising plastic, such as a polyolefin, polypropylene, polyethylene, PET, etc., a metal, nylon, vinyl, foils, paper, paperboard stock and/or other materials. The object can have one or more of curved or flat surfaces, but preferably have a curved surface which is circular or oval in cross-section. Treatment system 10 can treat cylindrical and rounded oval containers in the range of ¼ oz. to 1 gallon (8 oz. to 3.87 Liters), or more.

The objects to be treated can be cylindrical, having an outside diameter of 0.25 to 8 inches (6.3 mm to 200 mm) and a height of 0.5 inch or more (12.5 mm), or rounded oval containers having a width of 0.5 inch to 6 inches (12.5 mm to 150 mm), a depth of 0.5 inch to 6 inches (12.5 mm to 150 mm), and a height of 0.5 inch to 16 inches (12.5 mm to 406 mm). Alternative sizes and shapes are contemplated. For example, an alternative embodiment of system 10 can be configured to treat objects having a diameter of twelve inches (300 mm), two feet (600 mm), or more and a height of six inches (150 mm) or more.

Treatment system 10 is designed for convenient installation into molding and/or printing lines and comprises a loading platform 20 and an unloading platform 22. Loading platform 20 is configured to receive objects to be treated and unloading platform 22 is configured to provide treated objects to subsequent manufacturing steps. Treatment system 10 can also be used as a stand-alone workstation.

Referring again to FIG. 1, a plurality of subsystems of treatment system 10 are illustrated in block diagram form. A power supply 12 is configured to receive an input voltage and to provide power to one or more high voltage transformers 17. An operator interface 14 is coupled to a control system 15, which is coupled to at least one of power supply 12 and conveyor system 16 to allow an operator or user to control the starting and stopping of conveyor system 16 and to control other functions of treatment system 10. Operator interface can include buttons, switches, etc. and also output devices, such as a display, lights, a buzzer, etc.

Figure 3:
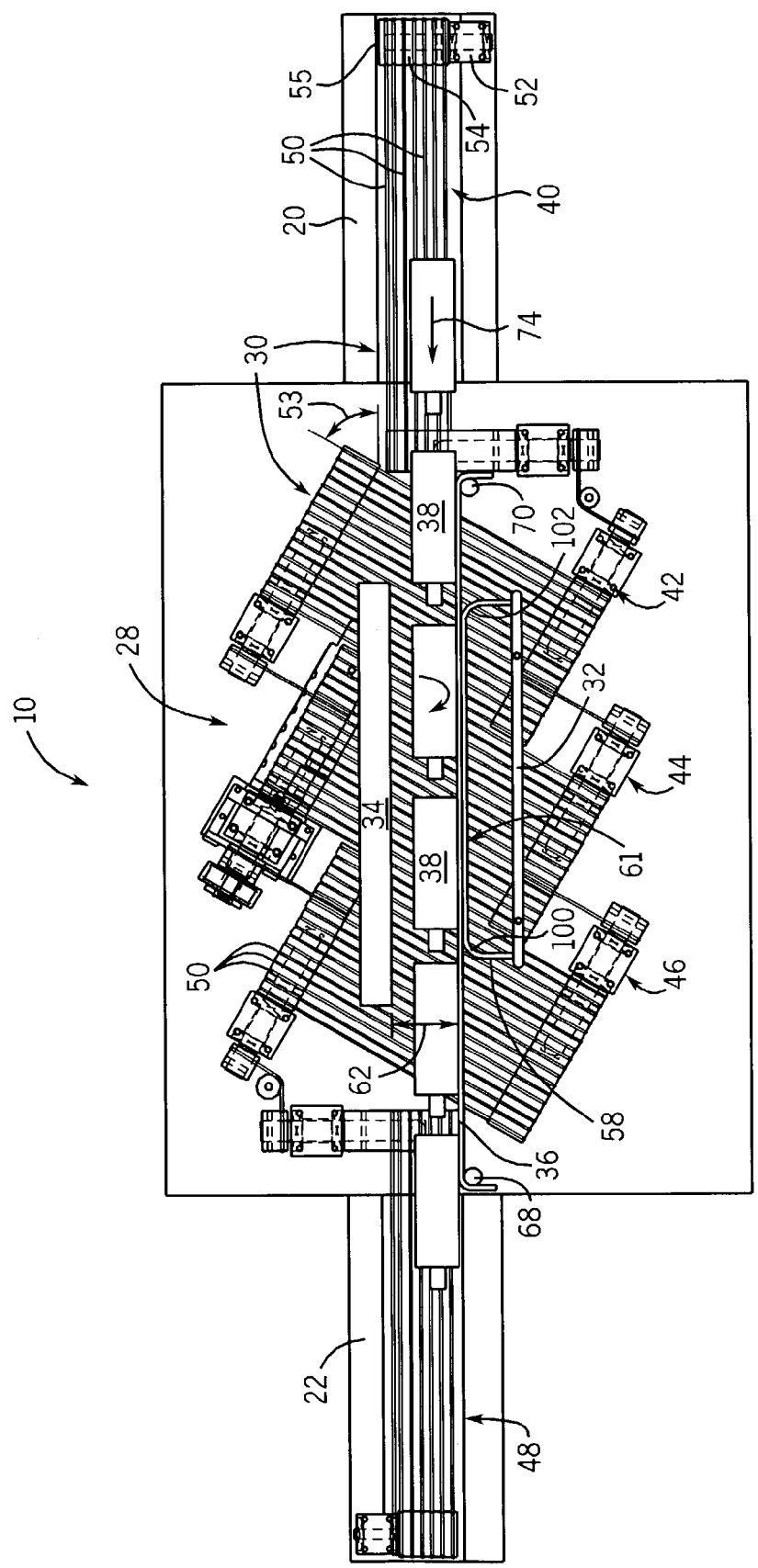
FIG. 3 is a cutaway view taken along line 3—3 in FIG. 1, according to an exemplary embodiment.

Power supply 12 is configured to provide power to transformers 17. Transformers 17 provide high voltage power to electrodes 18, which can be between 0 and 50 mA of 6–75 kHz electricity at between 10 and 100 kV. Electrodes 18 (wire electrode 32 and counter electrode 34, as shown in FIG. 3) are disposed in the vicinity of the objects to be treated to generate a corona or other electrical discharge to treat the surface of the objects. In this embodiment, transformers 17 comprise a first transformer configured to provide high voltage power to one electrode and a second transformer configured to provide high voltage power to a second electrode. The two transformers provide high voltage power to respective electrodes out of phase, and the voltages can be the same or different. Alternatively, one transformer can provide power to one electrode 18, while the other electrode is on ground potential. Electrodes 18, high voltage transformers 17 and power supply 12 are configured to provide treatment of up to 70 milliNewtons/Meter (mN/M or dyne/cm), depending on the application. Control system 15 (e.g., comprising one or more digital and/or analog control components, such as, a microprocessor, a microcontroller, an application-specific integrated circuit, etc.) is configured to control conveyor system 16 with a speed of 32 feet (10.7 m) per minute or less. Alternatively, conveyor system 16 can be operated at speeds greater than 32 feet per minute.

Figure 2:
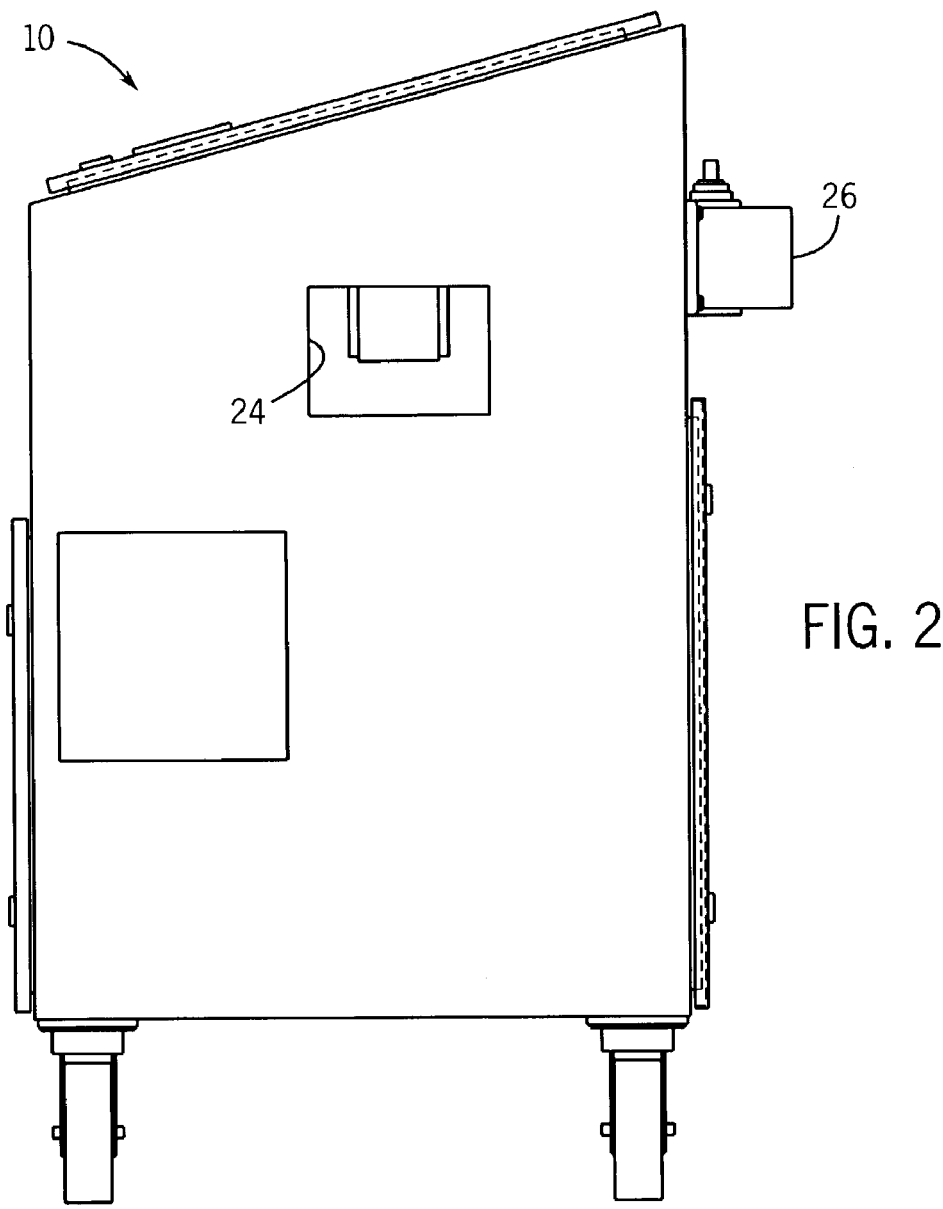
FIG. 2 is a right side view of the system of FIG. 1, according to an exemplary embodiment.

Referring now to FIG. 2, a right side view of treatment system 10 is shown, illustrating an intake aperture 24 configured to receive the objects to be treated. An ozone exhaust and filter connection and/or system 26 is provided to reduce the ozone level in and around treatment system 10.

Referring now to FIG. 3, treatment system 10 is shown in a cutaway view. In this exemplary embodiment, treatment system 10 comprises a conveyor system 28 comprising a conveyor 30, first and second electrodes 32, 34 (e.g., both electrodes having the same or similar power level 180 degrees out of phase), and a guide 36. Conveyor 30 moves or conveys objects 38 through treatment system 10 and can comprise any of a plurality of conveying or moving mechanisms, such as conveyor belts, actuators, motors, robotic arms, pulleys, air flow or suction devices, rollers, etc. In this exemplary embodiment, conveyor 30 comprises a first conveyor 40 configured to convey objects 38 toward guide 36 and electrode 32. Conveyor 30 further comprises one or more second conveyors 42, 44, and 46 configured to move and rotate objects 38. Conveyor 30 further comprises a third conveyor 48 configured to convey objects along unloading platform 22 away from electrode 32. Each of conveyors 40–48 comprises a corresponding motor, which can be a DC motor, servo motor, drive motor, or other motor, and a conveyor belt or belts. It is understood that different embodiments of conveyor 30 can have one, two, or three conveyors (or more) performing various moving or rotating functions, and that conveyors can include belts or alternative conveying mechanisms, such as, a robotic arm, roller, etc.

According to one advantageous aspect of this embodiment, the conveyor belt of one or more of conveyors 40–48 comprises a plurality of flexible or bendable or stretchable belts. Each belt is flexible and can comprise urethane in a toroid or "O"-ring shape having a cross-sectional diameter or thickness of approximately one-eighth of an inch, or less than one inch. In this embodiment, each of conveyors 40–48 comprises at least three "O"-ring shaped belts, each belt having a thickness of approximately one-quarter of an inch. Alternative materials can be used. The motor or motors (only one motor drives all of conveyors 40–48 in this exemplary embodiment) of each of conveyors 40–48 are driven under control of control system 15 and operator interface 14 (FIG. 1) to rotate the plurality of belts to impart movement on objects 38 through treatment system 10.

In one example, a motor 52 drives a pulley 54 to rotate belts 50. Pulley 54 has an open end 55 to allow for easy changing of belts. Furthermore, the stretchability of the belts also provides for easy changing of the belts. Furthermore, belt tensioning and alignment systems are not required in the embodiment shown. Corona treatment can discolor, damage, or wear away at the belts over a long period of time and, therefore, it is advantageous to have belts which are easily replaceable. In alternative embodiments, belts 50 can be a conventional one-piece sheet-type belt.

First conveyor 40 is configured to receive objects 38 and convey the objects toward electrode 32 and guide 36. Second conveyors 42–46 are configured to rotate objects 38 for exposure to electrical discharge from electrode 32. In this embodiment, second conveyors 42–46 have belts which are disposed and/or which move along an axis nonparallel to belts of first conveyor 40 and/or third conveyor 48. Second conveyors 42–46 have belts which are disposed or provided at an angle 53 of approximately 60 degrees (which may be greater or less than 60 degrees, such as, any angle between 5 degrees and 85 degrees) relative to the belts of first conveyor 40. The belts of second conveyors 42–46 are also angled relative to the direction of travel of objects 38, which travel along the longitudinal axis of objects 38 in this exemplary embodiment. Second conveyors 42–46 may number one, two, or more, but preferably include three separate conveyor mechanisms. Each mechanism may have a motor and a plurality of belts, or all mechanisms may be driven by a single motor. Second conveyors 42–46 are configured to rotate objects 38 and to push objects 38 against guide 36 while conveying objects 38 along the same direction of travel as conveyed by first conveyor 40.

Figure 4:
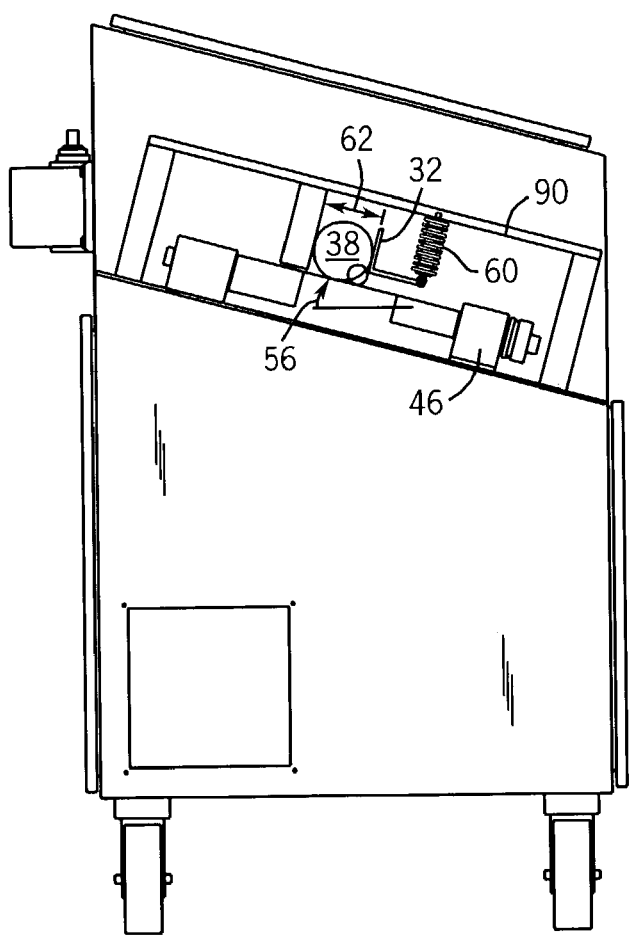
FIG. 4 is a cutaway view taken along line 4—4 of FIG. 1, according to an exemplary embodiment.

Referring to FIG. 4, it is shown that, according to one exemplary embodiment, second conveyors 42–46 are inclined at an angle 56, which can be 15 degrees, or can be greater or less than 15 degrees, relative to a plane perpendicular with the ground beneath system 10 or a bottom surface of system 10. In this embodiment gravity provides further pushing of objects 38 against guide 36.

Referring again to FIG. 3, electrode 32 comprises a wire electrode 58 in this embodiment. Advantageously, wire electrode 58 forms a loop or a rectangle with a wire electrode having a cross-sectional diameter of less than 0.25 inches. An electrode having a cross-sectional diameter of less than 0.25 inches is advantageous for treating empty containers with an optimal electrical discharge. Electrode 32 is further coupled to insulators/isolators 60 (FIG. 4) and to transformers 17 (FIG. 1). In this exemplary embodiment, wire electrode 58 comprises stainless steel and is manufactured by a cold draw method. The cold draw method comprises providing a stainless steel wire of a predetermined length and cross-sectional diameter and drawing the wire, i.e., providing a pulling force on ends of the wire. The pulled or drawn wire has a greater length and smaller, controlled cross-section diameter and surface finish than before the pulling operation. Preferably, the pulling is done without the use of applied heat. Cold drawn stainless steel wire can be two to ten times the hardness of other stainless steel wires, which makes it more durable and more resistant to scratches. A scratch or imperfection in the wire can result in a high volume of streamers during corona treating which can result in uneven treatment of the object to be treated. The smaller the diameter of wire electrode 58, the easier it is for electrical discharge to release from the electrode with a lower driving voltage.

Another advantageous feature of wire electrode 58 is that it comprises corners 100, 102 which are curved with a large radius, preferably more than 0.25 inches or between 0.25 inches and 3 inches. A sharp edge at corners 100, 102 can result in an intense discharge of electricity, which can result in uneven treatment and can degrade or even melt the dielectric material in electrode 34.

In this exemplary embodiment, wire electrode 58 has a rectangular shape comprising a treatment side 61 having a length of approximately 17 inches (though it may be greater or less than 17 inches in alternative embodiments). The greater the length of treatment side 61, the faster that objects 38 can be moved and rotated across wire electrode 58 by conveyor 30.

Figure 6:
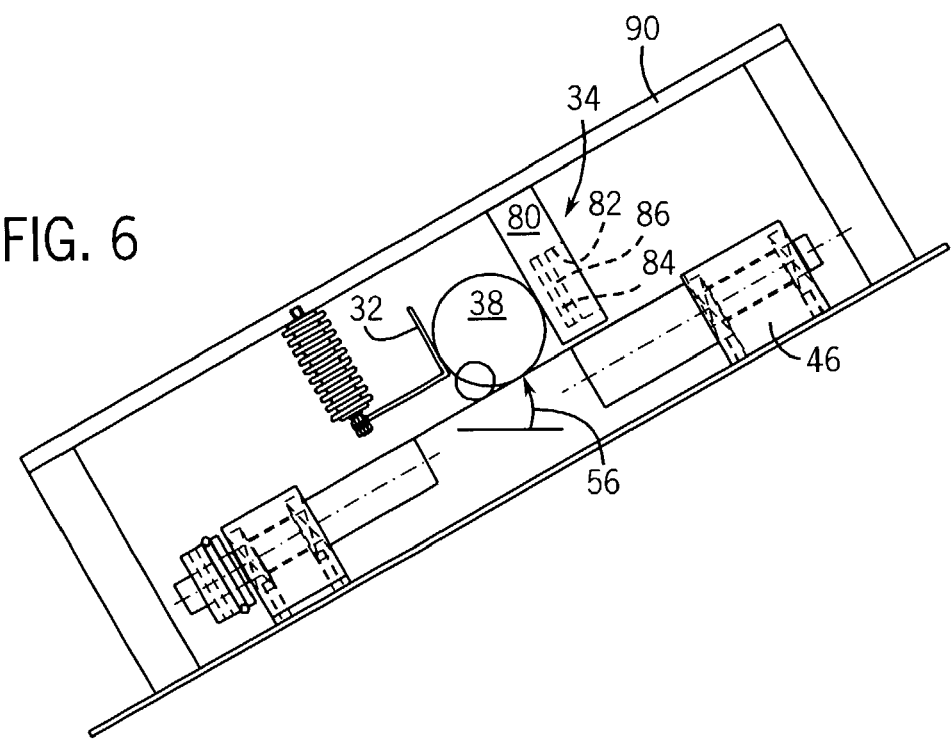
FIG. 6 is a cutaway view taken along line 6—6 in FIG. 1, according to an exemplary embodiment.

A second electrode 34 is disposed a predetermined distance 62 (FIG. 4) from first electrode 32. Referring to FIG. 6, second electrode 34 is shown in greater detail. Second electrode 34 comprises a dielectric material 80 defining a U-shaped recess 82. A metal counter electrode 84 is disposed in U-shaped recess 82 and held in a fixed position in part by a casing 86. Dielectric material 80 can comprise polyethylene, silicone, ceramic, glass, Teflon, or other dielectric materials. Recess 82 can be bored into dielectric material 80 and can take any of a variety of shapes. Electrode 84, which can comprise aluminum, is coupled to transformer 17 and is configured to receive a high voltage alternating power from transformer 17 for producing an electrical discharge between electrodes 32 and 34. Casing 86 can be silicone or another material configured to encase electrode 84. Electrodes 32 and 34 are fixed to a base or housing 90 of treatment system 10, which can be a metal rail, frame, or other base or housing. Advantageously, in this embodiment, both first electrode 32 and second electrode 34 are fixed and non-user-adjustable to provide for improved convenience for the user and because conveyor 30 does not require adjustment to treat containers having different sizes and shapes.

Referring again to FIG. 3, conveyor 30 further comprises a guide 36 which can be any type of material, such as metal, plastic, etc. Second conveyor 42–46 is configured to rotate objects 38 against guide 36 to provide exposure of surfaces (preferably 360 degrees of surfaces) of objects 38 to electrical discharge from electrode 32. Further, guide 36 and second conveyor 42–46 maintain objects 38 at the same longitudinal alignment of objects 38 as on first conveyor 40.

Figure 5:
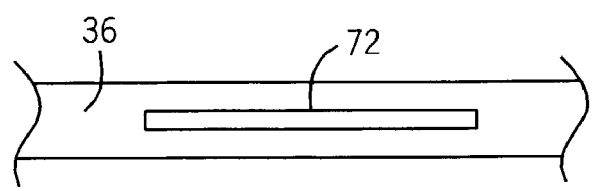
FIG. 5 is a front view of a guide, according to an exemplary embodiment.

While guide 36 may take many embodiments, in this embodiment guide 36 is a thin-walled guide mask which is fixed and not user adjustable. Guide 36 is a non-conductive plastic sheet (e.g., Mylar, PET, etc.) or other materials having a high tensile strength, dimensional stability, high electrical insulating properties, and/or resistant to oil, water and ozone. Guide 36 provides a spring tensioning device 68 and 70 configured provide tension to guide 36 by pulling guide 36 firmly into a fixed, non-user-adjustable position for improved guiding of objects 38. Mask 36 is preferably 10 mills thick and two inches high, but can be greater or less than these dimensions. Preferably, guide 36 has a length that exceeds the length of treatment side 61 of electrode 32. As illustrated in FIG. 5, mask 36 comprises an aperture 72 or electrode cut-out having a length of approximately the length of treatment side 61 of electrode 32 and a narrow width. Aperture or slot 72 provides an opening for electrical discharge to travel from electrode 32 to objects 38. Due to the thin wall of the mask, the mask has a minimum mass, and the discharge will release through aperture 72 onto objects 38. A minimal amount of electrical discharge will occur between electrode 32 and mask 36, reducing the wear of guide mask 36 and loss of electrical discharge treatment.

Referring again to FIG. 3, third conveyor 48 is disposed parallel to the ground, as is first conveyor 40 in this exemplary embodiment. Third conveyor 48 is configured to receive objects 38 from second conveyor 42–46 and to convey objects 38 away from electrode 32. In an alternate embodiment, third conveyor 48 is not part of system 10, and objects 38 are moved by second conveyors 42–46 directly to a collecting bin outside of system 10, or to a conveyor of another processing system.

In operation, objects 38 are provided to first conveyor 40 at loading platform 20 and are conveyed by first conveyor 40 to second conveyor 42–46. The functions of first conveyor 40 and second conveyor 42–46 can be combined into a single conveyor. Notably, objects 38 maintain the same direction of travel and same orientation (along the longitudinal axis of objects 38) as objects 38 move from first conveyor 40 to second conveyor 42–46.

Second conveyor 42–46 and guide 36 are configured to rotate objects 38 axially or around a longitudinal axis 74 of objects 38 for exposure to electrical discharge from electrode 32 through aperture 72 (FIG. 5) of guide 36. The angle of incline 56 (FIG. 4) of second conveyor 42–46 provides improved contact between second conveyor 42–46 and guide 36. Second conveyor 42–46 is configured to convey objects 38 between electrode 32 and second electrode 34. The electrical discharge from electrodes 32 and/or 34 is sufficient to oxidize a surface, and preferably surfaces on all sides of object 38 to make the surfaces receptive to inks, adhesives, liquids, etc. Second conveyor 42–46 and guide 36 are configured to rotate objects 38 at least one 360° revolution (which may be more or less than a full 360° revolution in alternative embodiments) and to move objects 38 to third conveyor 48 for removal from treatment system 10. Thus, conveyor 30 has a loading portion at first conveyor 40 configured to receive the object and a treatment portion at a portion of second conveyor 42–46 near electrode 32, wherein the conveyor is configured to maintain objects 38 in the same longitudinal alignment in both the loading portion and the treatment portion. Further, second conveyor 42–46 and guide 36 cooperate to maintain a treatment surface of object 38 at a pre-determined distance from electrode 32 to insure a uniform treatment. This predetermined distance is not user-adjustable in this embodiment.

First conveyor 40 and second conveyor 42–46 can be coplanar, or alternatively may be non-coplanar, such as, where second conveyor 42–46 is inclined. In an embodiment were second conveyor 42–46 is inclined and non-parallel with first conveyor 40, optimal pressure is provided to push object 38 against electrode 32 to provide consistent treatment by electrical discharge.

In this embodiment, second conveyors 42–46 are coplanar with each other, but in alternative embodiments, they may be non-coplanar and one or more of second conveyors 42–46 may drive belts parallel with conveyor 40 and/or conveyor 48.

Guide 36 is a single guide in this embodiment, but may alternatively be multiple guides and may be provided at different locations.

While the exemplary embodiments illustrated in the FIGS. and described above are presently preferred, it should be understood that these embodiments are offered by way of example only. Accordingly, the present invention is not limited to a particular embodiment, but extends to various modifications that nevertheless fall within the scope of the appended claims.

What is claimed is:

1. A conveyor system for exposing an object to an electrical discharge to increase the surface tension of a surface of the object, comprising:
   a guide;
   a first conveyor configured to convey the object toward the guide;
   an electrode configured to provide an electrical discharge; and
   a second conveyor, wherein the guide and the second conveyor are configured to rotate the object for exposure to the electrical discharge.

2. The conveyor system of claim 1, wherein the object maintains the same longitudinal alignment on the first conveyor and the second conveyor.

3. The conveyor system of claim 1, wherein the first conveyor has a belt which is nonparallel to a belt of the second conveyor.

4. The conveyor system of claim 1, wherein the second conveyor has an inclined belt configured to push the object against the guide.

5. The conveyor system of claim 1, wherein the second conveyor comprises a plurality of flexible belts.

6. The conveyor system of claim 5, wherein the plurality of flexible belts have a cross-sectional diameter of less than approximately one inch.

7. The conveyor system of claim 1, wherein the first conveyor is configured to convey the object along a direction of travel and the second conveyor is configured to convey the object along the same direction of travel and to push the object against the guide.

8. The conveyor system of claim 1, further comprising a third conveyor configured to receive the object from the second conveyor and to convey the object away from the electrode.

9. The conveyor system of claim 1, further comprising a second electrode, wherein the second conveyor is configured to convey the object between the electrode and the second electrode.

10. The conveyor system of claim 1, wherein the electrode is in a fixed position relative to the guide.

11. The conveyor system of claim 1, wherein the electrical discharge is configured to oxidize a surface of the object to make the surface receptive to at least one of inks and adhesives.

12. A system for exposing an object to an electrical discharge, comprising:
   an electrode configured to provide an electrical discharge;
   a first conveyor comprising a first belt moving in a first direction configured to move the object toward the electrode; and
   a second conveyor comprising a second belt moving in a second direction not parallel to the first direction, wherein the second conveyor is configured to rotate the object for exposure to the electrical discharge, whereby the surface tension of a surface of the object is changed.

13. The system of claim 12, further comprising a guide configured to position the object at a predetermined distance from the electrode, wherein the predetermined distance is not user-adjustable.

14. The system of claim 13, wherein the second belt is inclined to push the object against the guide.

15. The system of claim 12, wherein the first conveyor and second conveyor have conveying surfaces which are coplanar.

* * * * *